United States Patent [19]

Maeda

[11] 3,829,803
[45] Aug. 13, 1974

[54] SEATING DETECTING DEVICE
[75] Inventor: Tsuneo Maeda, Aichi, Japan
[73] Assignee: Kabushiki Kaisha Tokai-Rika-Denki-Seisakusho, Aichi, Japan
[22] Filed: Dec. 10, 1973
[21] Appl. No.: 423,616

[30] Foreign Application Priority Data
Dec. 30, 1972 Japan.............................48-3851

[52] U.S. Cl............................... 335/205, 200/85 A
[51] Int. Cl. ............................................ H01h 3/14
[58] Field of Search.... 335/205; 200/61.58 B, 85 A; 340/278

[56] References Cited
UNITED STATES PATENTS
3,226,674 12/1965 Eriksson....................... 200/61.58 B
3,340,523 9/1967 Whitman...................... 200/61.58 B
3,703,618 11/1972 Lewis............................... 200/85 A
3,736,397 5/1973 Pedersen............................. 335/205
3,769,476 10/1973 Eberle.............................. 200/85 A Primary Examiner—Roy N. Envall, Jr.
Attorney, Agent, or Firm—Pollock, Philpitt & Vande Sande

[57] ABSTRACT

A seating detecting device comprising a pressure receiving member of synthetic resin, a bracket of synthetic resin, a permanent magnet mounted in the pressure receiving member, and a magnetically actuated switch mounted in the bracket. The device is simple in construction, inexpensive and mechanically strong and can be very easily mounted on the seat spring in the seat of vehicles.

1 Claim, 4 Drawing Figures

PATENTED AUG 13 1974　　　　　　　　　　　　　　3,829,803

SEATING DETECTING DEVICE

BACKGROUND OF THE INVENTION

This invention relates to a device for detecting seating of occupants on the seats of automotive vehicles and the like.

Laws demanding provision of occupant safeguard means in vehicles are being established in various countries of the world. When such a law is enacted, provision of a variety of safeguard means in vehicles will be obligated to ensure the safety of occupants. The seat belt is one of such safeguard means demanded by the law. According to the law, provision of a device will be demanded in a vehicle so that the vehicle cannot be started unless the seat belts are fastened to the body of the occupants, and this device is generally designed so that the seat belts can be automatically fastened to the body of the occupants. In this case, a control signal is required in order to initiate the automatic fastening of the seat belts to the body of the occupants, and to this end, a seating detecting device for detecting seating of the occupants on the seats of the vehicle is required in order to obtain this control signal. Although various seating detecting devices have heretofore been proposed in an attempt to attain the above purpose, all of the prior art devices have been expensive and impractical.

SUMMARY OF THE INVENTION

It is therefore a primary object of the present invention to provide a novel and useful seating detecting device for use in automotive vehicles and the like which is mechanically strong and inexpensive and can be easily mounted in the seat of the vehicles.

The seating detecting device according to the present invention comprises a substantially disc-shaped pressure receiving member of synthetic resin, a bracket of synthetic resin integrally incorporated in this pressure receiving member by being combined or assembled with the pressure receiving member in a bayonet coupling fashion, and a permanent magnet and a magnetically actuated switch mounted in the pressure receiving member and bracket respectively.

The bracket includes a substantially disc-shaped head portion situated beneath the pressure receiving member, a neck portion of small diameter extending integrally from this head portion, and a relatively large flange portion extending integrally from this neck portion. The seat spring in the seat of the vehicle is received in the space around this neck portion for supporting the bracket thereon so that the assembly consisting of the pressure receiving member and the bracket can be mounted on the seat spring.

A coil spring is disposed in the space defined between the lower surface of the pressure receiving member and the upper surface of the head portion of the bracket so as to normally bias the pressure receiving member away from the head portion of the bracket. When an occupant sits on the seat of the vehicle, the pressure receiving member is foced toward the head portion of the bracket against the force of the coil spring, and then the magnetically actuated switch incorporated in the bracket is closed by the magnetic flux of the permanent magnet incorporated in the pressure receiving member, whereby seating of the occupant on the seat can be detected.

The novel features which are considered as characteristic for the invention are set forth in particular in the appended claim. The invention itself, however, both as its construction and its method of operation, together with advantages thereof, will be best understood from the following description of a preferred embodiment of the invention when read in connection with the accompanying drawings.

DESCRIPTION OF THE PREFERRED EMBODIMENT

Figure 1:
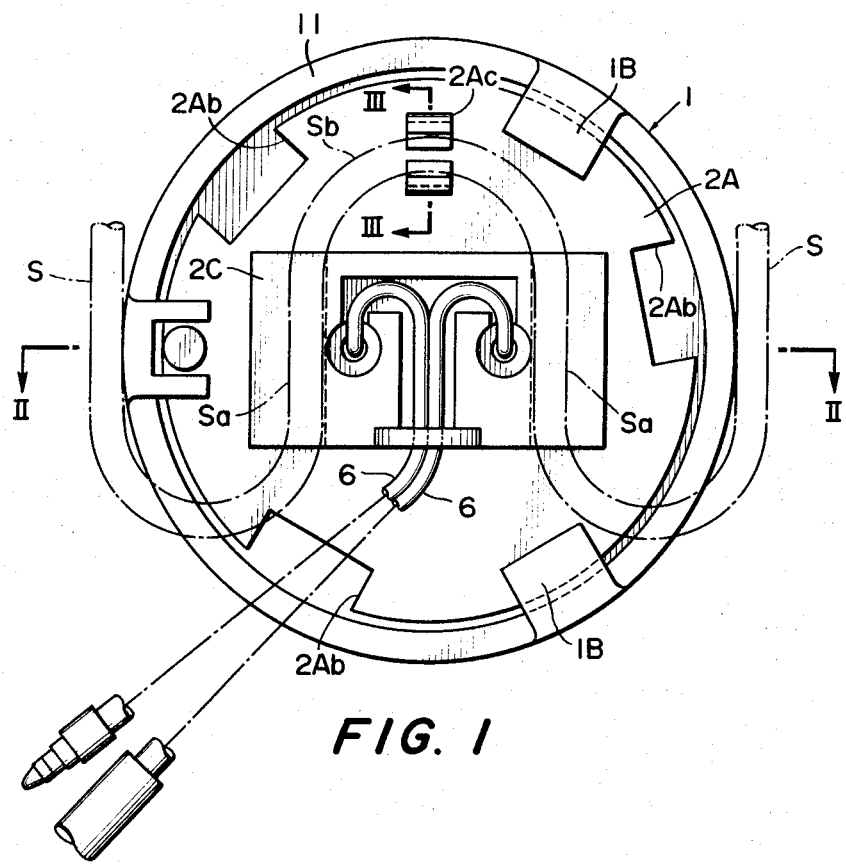
FIG. 1 is a bottom plan view of a device according to the present invention.
Figure 2:
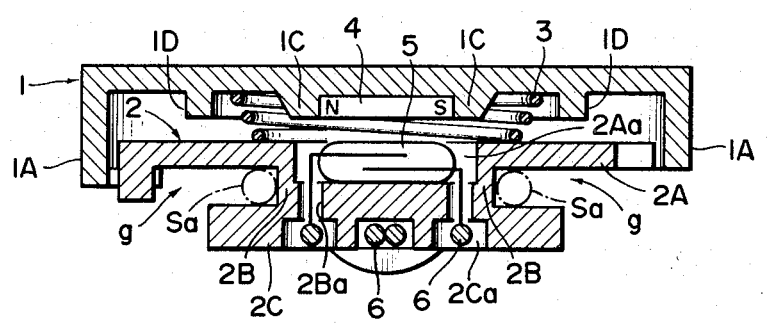
FIG. 2 is a vertical section taken on the line II — II in FIG. 1.

FIG. 1 is a bottom plan view of a seating detecting device according to the present invention when it is mounted on a seat spring S used in the seat of vehicles, and FIG. 2 is a vertical section taken on the line II — II in FIG. 1. Referring to FIGS. 1 and 2, the detecting device comprises a pressure receiving member 1 of relatively strong and light synthetic resin such as polyacetal resin and a bracket 2 of similar synthetic resin combined or assembled with the pressure receiving member 1. This pressure receiving member 1 is substantially in the form of a disc and is provided at the outer peripheral edge of one of the disc surfaces thereof with a rim 1A extending perpendicularly with respect to the disc surface, and a plurality of tongues 1B are formed integrally with the rim 1A to extend inwardly in parallel with the disc surface from spaced positions of the entire circumference of the lower end portion of the rim 1A. These tongues 1B serve as a means for the integral incorporation of the pressure receiving member 1 and bracket 2 in a bayonet coupling fashion as will be described later. The central portion of the disc surface of the pressure receiving member 1 having the rim 1A is provided with an inner annular projection 1C having a frusto-conical shape and an outer annular projection 1D having a cylindrical shape surrounding the annular projection 1C. The large-diameter end portion of a conical spring 3 is seated in an annular groove defined between the annular projections 1C and 1D. A bar-shaped permanent magnet 4 is mounted in a circular recess surrounded by the inner annular projection 1C.

The bracket 2 comprises a substantially disc-shaped head portion 2A, a neck portion 2B extending downward from the central portion of the lower surface of this disc-shaped head portion 2A, and a rectangular flange portion 2C extending outwardly from the lower end of this neck portion 2B. A cavity 2Aa is formed in the central portion of the disc-shaped head portion 2A and extends toward the neck portion 2B. The bracket 2 is situated so that this cavity 2Aa is opposite to the permanent magnet 4 mounted in the circular recess of the pressure receiving member 1. A magnetically actuated switch 5 is accommodated within the cavity 2Aa, and the small-diameter end portion of the conical spring 3 is seated on the upper surface of the head portion 2A adjacent to the peripheral edge portion of the cavity 2Aa. The magnetically actuated switch 5 is connected to a control circuit (not shown) by lead wires 6 which extend through lead wire passages 2Ca formed in the rectangular flange portion 2C.

A plurality of rectangular cutouts 2Ab are formed at spaced positions of the outer peripheral edge of the disc-shaped head portion 2A of the bracket 2 to serve as a means for providing communication between the external atmosphere and the space defined between the pressure receiving member 1 and the head portion 2A of the bracket 2.

Figure 3:
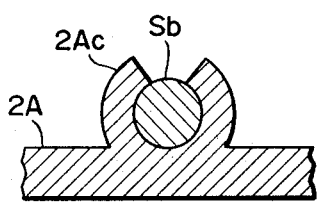
FIG. 3 is an enlarged section taken on the line III — III in FIG. 1.

A seat spring holding member 2Ac projects from a portion of the lower surface of the disc-shaped head portion 2A of the bracket 2 and has a sectional shape such that a circular tube is partly cut away along the axial direction thereof as shown in FIG. 3. This seat spring holding member 2Ac acts as a means for firmly grasping the seat spring S. This seat spring holding member 2Ac is disposed at such a position that it can conveniently grasp the apex portion Sb of the U-shaped seat spring S when the device according to the present invention is mounted on the straight portions Sa of the U-shaped seat spring S.

A pair of horizontally extending gaps g are formed around the neck portion 2B connecting the disc-shaped head portion 2A with the rectangular flange portion 2C, and these gaps g are defined by the lower surface of the disc-shaped head portion 2A, the upper surface of the rectangular flange portion 2C and the outer peripheral surface of the neck portion 2B of the bracket 2. These gaps g serve as insertion passages for the straight portions Sa of the U-shaped seat spring S and also as a guide means for guiding the device of the present invention along the straight portions Sa of the seat spring S when the device is mounted on the seat spring S.

The device of the present invention having the structure above described can be mounted on the seat spring S in a manner as described below.

Figure 4:
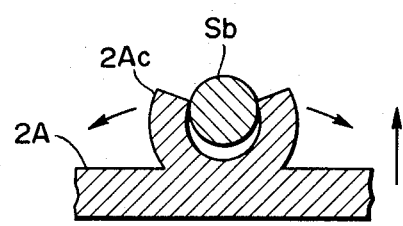
FIG. 4 is a view similar to FIG. 3 to schematically show the seat spring is grasped by the seat spring holding means when the device according to the present invention is mounted on the seat spring.

At first, the pressure receiving member 1 is combined or assembled with the bracket 2. This assembling operation includes placing the pressure receiving member 1 on the bracket 2 in such a relation that the tongues 1B extending inwardly from the lower end portion of the rim 1A of the pressure receiving member 1 register with the corresponding cutouts 2Ab formed at the outer peripheral edge of the head portion 2A of the bracket 2, pressing the pressure receiving member 1 toward the head portion 2A of the bracket 2, and then rotating the pressure receiving member 1 relative to the bracket 2. Thus, the tongues 1B passed through the corresponding cutouts 2Ab of the head portion 2A of the bracket 2 are moved in the circumferential direction along the lower surface of the head portion 2A, and the pressure receiving member 1 and the bracket 2 are coupled together in bayonet coupling fashion, so that they cannot make any movement in the central axial direction thereof. After assembling the pressure receiving member 1 and the bracket 2 in this manner, the detecting device of the present invention is manually forced in a direction as shown by the arrow F in FIG. 1 so that the straight portions Sa of the seat spring S can be received in the opposite gaps g formed around the neck portion 2B of the bracket 2. In this manner, the device of the present invention can be guided at the neck portion 2B of the bracket 2 to be moved along the straight portions Sa of the U-shaped seat spring S. After the seat spring holding member 2Ac in the device of the present invention has been advanced to a position adjacent to the U-bent portion Sb of the seat spring S, the pressure receiving member 1 is rotated relative to the bracket 2 until the seat spring holding member 2Ac projecting from the lower surface of the pressure receiving member 1 registers with the U-bent portion Sb of the seat spring S. Then, when the pressure receiving member 1 is forced toward the bracket 2, the axially cut-away portion of the holding member 2Ac projecting from the lower surface of the pressure receiving member 1 is forcedly opened as shown in FIG. 4 and the U-bent portion Sb of the seat spring S is finally firmly grasped by the holding member 2Ac as shown in FIG. 3 by further impartation of the downward force to the pressure receiving member 1. Thus, the device of the present invention can be easily mounted on the seat spring.

The seating detecting device according to the present invention is simple in construction, and by virtue of the fact that a contactless switch is employed therein, it is substantially free from damage due to shocks imparted during seating of occupants and is endurable against severe uses. Further, the device of the present invention is remarkably convenient in that it can be very easily mounted on the seat spring.

What is claimed as new and desired to be protected by Letters Patent is set forth in the appended claim:

1. A seating detecting device comprising a bracket including a substantially disc-shaped head portion, a cavity formed in the central portion of said head portion, a neck portion extending integrally from said head portion and having a space formed therearound for receiving portions of a seat spring used in the seat of a vehicle therein, a relatively large flange portion extending integrally from said neck portion, and a holding member projecting from the lower surface of said head portion for grasping a portion of the seat spring; a substantially disc-shaped pressure receiving member having a rim extending from the outer peripheral end edge thereof for fitting on said head portion of said bracket, said pressure receiving member being provided with a central recess; a magnetically actuated switch mounted in said cavity formed in said head portion of said bracket; a permanent magnet mounted in said central recess of said pressure receiving member opposite to said magnetically actuated switch; and a coil spring interposed between said pressure receiving member and said head portion of said bracket.

* * * * *